United States Patent
Futagi et al.

[11] Patent Number: 6,032,029
[45] Date of Patent: Feb. 29, 2000

[54] RECEIVER SELECTING EITHER A FIRST DEMODULATED SIGNAL OR A SECOND DEMODULATED SIGNAL IN ACCORDANCE WITH CHARACTERISTICS OF A RECEIVED SIGNAL

[75] Inventors: Sadaki Futagi, Sagamihara; Mitsuru Uesugi, Yokohama; Hiroshi Suzuki; Hitoshi Yoshino, both of Yokosuka, all of Japan

[73] Assignees: Matsushita Communication Industrial Co., Ltd., Yokohama; NTT Mobile Communications Network Inc., Tokyo, both of Japan

[21] Appl. No.: 08/822,834

[22] Filed: Mar. 24, 1997

[30] Foreign Application Priority Data

Apr. 18, 1996 [JP] Japan .................................... 8-096600

[51] Int. Cl.⁷ ....................................... H04B 1/10
[52] U.S. Cl. ......................... 455/130; 455/296; 375/232; 375/233
[58] Field of Search ................................ 375/229, 231, 375/232, 233, 316, 329, 330, 327, 283; 455/296, 307, 275, 276.1, 277.1, 130, 278.1, 277.2, 205

[56] References Cited

U.S. PATENT DOCUMENTS

| | | | |
|---|---|---|---|
| 4,523,323 | 6/1985 | Nakajima et al. | 375/283 |
| 4,947,409 | 8/1990 | Raith et al. | 375/226.1 |
| 5,285,475 | 2/1994 | Kurokami | 375/233 |
| 5,297,165 | 3/1994 | Ueda et al. | 375/230 |
| 5,333,148 | 7/1994 | Tsubaki et al. | 375/234 |
| 5,388,123 | 2/1995 | Uesugi et al. | 375/234 |
| 5,414,737 | 5/1995 | Uesugi et al. | 375/340 |
| 5,530,721 | 6/1996 | Inoue et al. | 375/232 |
| 5,539,774 | 7/1996 | Nobakht et al. | 375/232 |
| 5,546,430 | 8/1996 | Liao et al. | 375/233 |
| 5,581,585 | 12/1996 | Takatori et al. | 375/232 |
| 5,638,400 | 6/1997 | Yaguchi | 375/233 |
| 5,646,958 | 7/1997 | Tsujimoto | 375/232 |
| 5,659,584 | 8/1997 | Uesugi et al. | 455/296 |
| 5,668,833 | 9/1997 | Kurokami et al. | 375/554 |
| 5,748,673 | 5/1998 | Futagi | 375/232 |
| 5,774,506 | 1/1997 | Futagi | 375/232 |

FOREIGN PATENT DOCUMENTS

| | | |
|---|---|---|
| 3-179852 | 8/1991 | Japan . |
| 3-182144 | 8/1991 | Japan . |
| 6-62068 | 3/1994 | Japan . |

*Primary Examiner*—Dwayne D. Bost
*Assistant Examiner*—Jean A. Gelin
*Attorney, Agent, or Firm*—Stevens, Davis, Miller & Mosher, L.L.P.

[57] ABSTRACT

An equalizer block forming part of a receiver compensates transmission path characteristics of a baseband received signal to generate a prediction signal, and differential-logic-converts a demodulated signal generated by demodulating the prediction signal to generate a differential-logic-conversion demodulated signal. A differential-detection demodulator block differential-detects the prediction signal from the equalizer block and subsequently demodulates the differential-detected prediction signal to generate a differential-detection demodulated signal. A selector block selects either the differential-logic-conversion demodulated signal from the equalizer block or the differential-detection demodulated signal from the difference-detection demodulator block.

14 Claims, 12 Drawing Sheets

STATIC CHARACTERISTIC

1

RECEIVER SELECTING EITHER A FIRST DEMODULATED SIGNAL OR A SECOND DEMODULATED SIGNAL IN ACCORDANCE WITH CHARACTERISTICS OF A RECEIVED SIGNAL

BACKGROUND OF THE INVENTION

1. Field of the Invention

The present invention relates generally to a receiver, and more particularly to a receiver suitable for use in mobile communication telephone systems, mobile data communication systems, and so on.

2. Description of the Related Art

Conventionally, as a receiver of the type mentioned above, a receiver employing an only-differential-detection scheme is known, for example, as disclosed in JPA-3-179852. As illustrated in FIG. 1, an only-differential-detection receiver typically includes a feedforward filter (FF filter) 102, a filter coefficient update circuit 103, a determination circuit 104, a differential detection convertor 105, and a positive/negative determination circuit 106. The feedforward filter 102 includes a plurality of cascade-connected delay elements, a plurality of multipliers respectively disposed at outputs of the plurality of delay elements, and an adder for adding output signals of the plurality of multipliers.

In the illustrated receiver, an input signal inputted from an input terminal 101 is sequentially delayed by the plurality of delay elements in the feedforward filter 102. Outputs of the respective delay elements are multiplied by the associated multipliers in the feedforward filter 102 by filter coefficients applied to the respective multipliers from the filter coefficient update circuit 103. Then, output signals of the respective multipliers are added to each other by the adder in the feedforward filter 102, and the resulting sum is inputted to the determination circuit 104 which performs demodulation. The filter coefficient update circuit 103 updates filter coefficients based on the result of the demodulation to optimize the filter coefficients. An output signal of the adder in the feedforward filter 102 is subjected to differential detection in the differential detection convertor 105, and subsequently is determined by the positive/negative determination circuit 106 whether the differential-detected output signal has a positive sign or a negative sign. The determination result of the positive/negative determination circuit 106 is outputted from an output terminal 107 as a differential detection demodulated output signal.

Since the prior art receiver determines the sign after differential detection is performed, as described above, the receiver can reduce a bit error rate (BER) due to the influence of frequency offset. However, the prior art receiver employs the only-differential-detection scheme implemented by the differential detection convertor 105. Such scheme is more susceptible to deteriorated characteristics, compared with a synchronization detection scheme, in environments free from the influence of frequency offset or fading.

SUMMARY OF THE INVENTION

It is an object of the present invention to provide a receiver employing an only-differential-detection scheme which is capable of compensating for deteriorated characteristics of the receiver to improve the reception characteristics.

A receiver according to the present invention comprises:

equalizing means for compensating transmission path characteristics of a baseband received signal to generate a prediction signal and for differential-logic-converting a demodulated signal generated by demodulating the prediction signal to generate a differential-logic-conversion demodulated signal;

differential-detection demodulating means for differential-detecting the prediction signal from the equalizing means and thereafter demodulating the differential-detected prediction signal to generate a differential-detection demodulated signal; and selecting means for selecting either the differential-logic-conversion demodulated signal from the equalizing means or the differential-detection demodulated signal from the differential-detection demodulating means.

DESCRIPTION OF THE PREFERRED EMBODIMENTS (First Embodiment)

Figure 1:
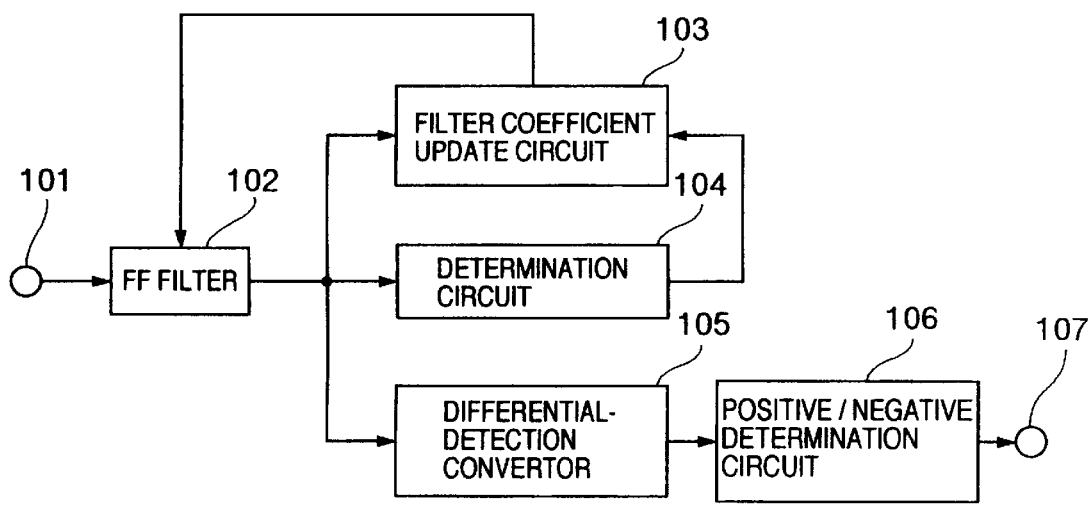
FIG. 1 is a block diagram illustrating the configuration of a prior art receiver.
Figure 2:
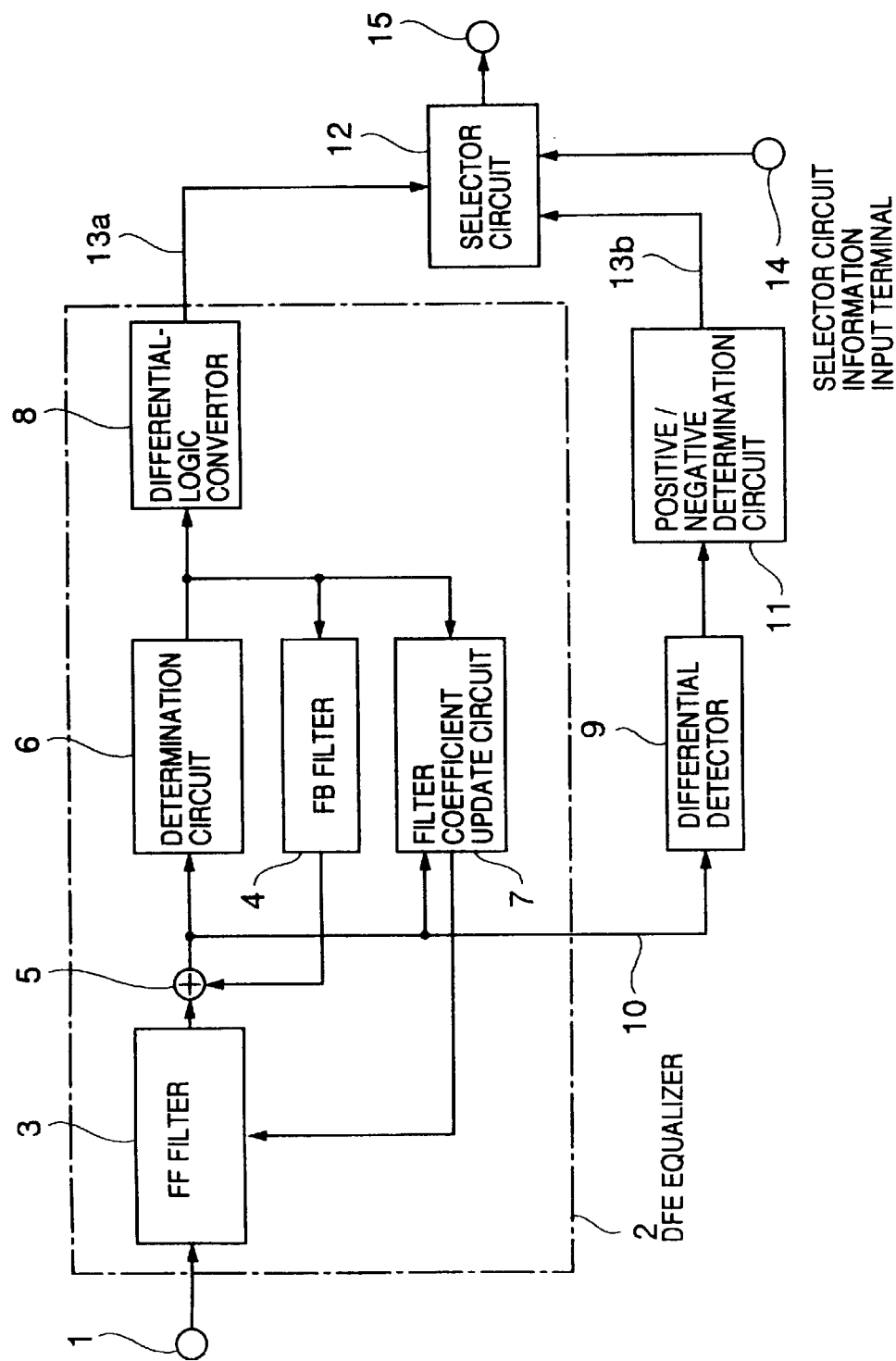
FIG. 2 is a block diagram illustrating the configuration of a receiver according to a first embodiment of the present invention.

Referring first to FIG. 2, a receiver according to a first embodiment of the present invention comprises an input terminal 1, a DFE (Decision Feedback Equalizer) equalizer 2, a differential detector 9, a positive/negative determination circuit 11, a selector circuit 12, a selector circuit information input terminal 14, and an output terminal 15. In the illustrated configuration, the DFE equalizer 2, which compensates the transmission path characteristics of an input signal, includes a feedforward filter (FF filter) 3, a feedback filter (FB filter) 4, an adder 5, a determination circuit 6, a filter coefficient update circuit 7, and a differential logic convertor 8. The differential detector 9 performs differential detection on a prediction signal 10 outputted from the adder 5 in the DFE equalizer 2. The positive/negative determination circuit 11 demodulates an output signal of the differential detector 9. The selector circuit 12 selects the one having the smaller bit error rate from a differential-logic-conversion demodulated output signal 13a outputted from the differential logic convertor 8 in the DFE equalizer 2 and a differential-detection demodulated signal 13b outputted from the positive/negative determination circuit 11, in accordance with a selector circuit information signal inputted thereto from the outside through the selector circuit information input terminal 14.

Figure 3:
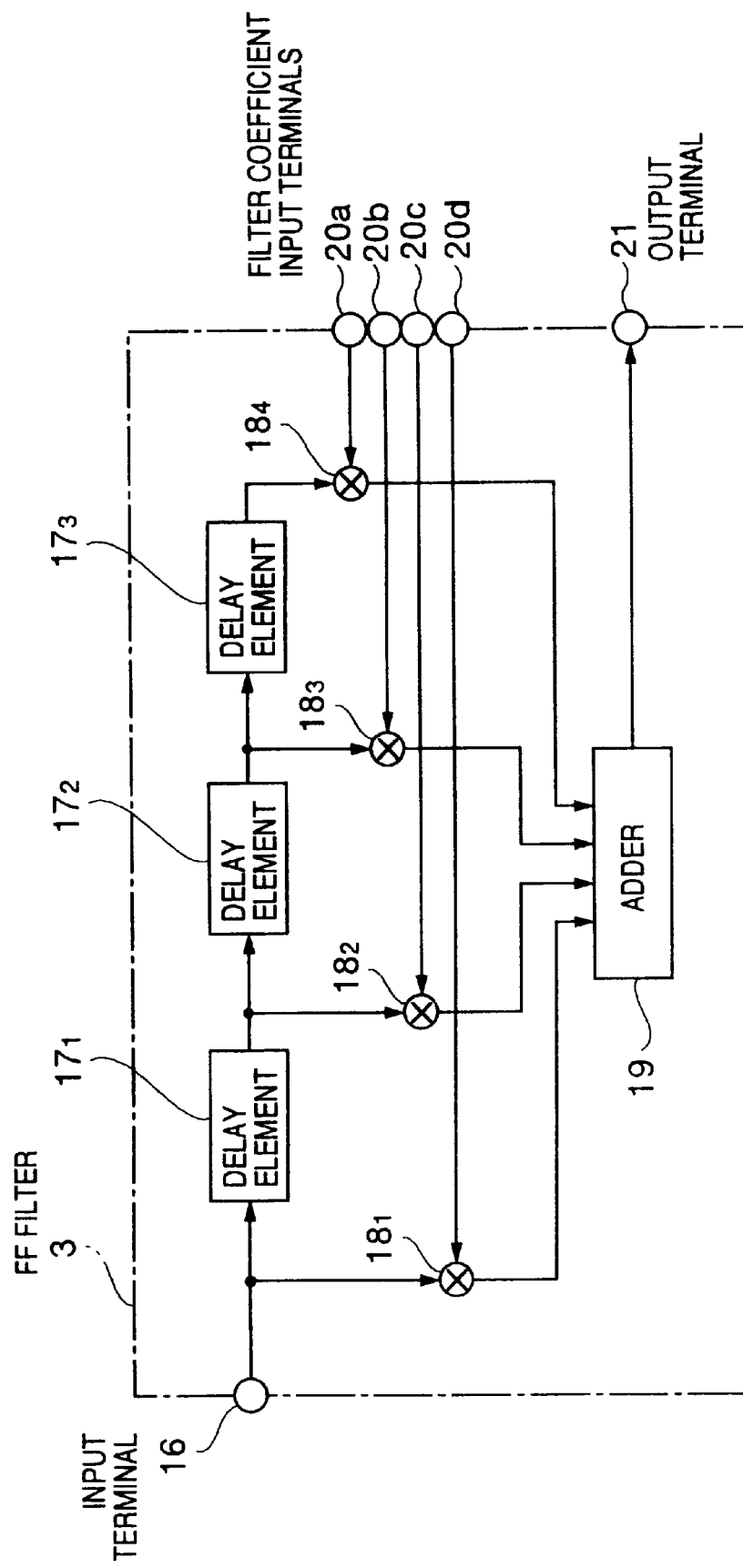
FIG. 3 is a block diagram illustrating the configuration of a feedforward filter shown in FIG. 1.

Referring next to FIG. 3, the feedforward filter 3 in the DFE equalizer 2 includes an input terminal 26, three cascade-connected delay elements 17₁–17₃, four multipliers 18₁–18₄, an adder for adding output signals of the four multipliers 18₁–18₄, four filter coefficient input terminals 20a–20d, and an output terminal 21 for outputting an output signal of the adder 19 to the outside. The three delay elements 17₁–17₃ sequentially delay an input signal from the input terminal 16. The multiplier 18₁ multiplies the input signal inputted through the input terminal 16 from the outside by a filter coefficient inputted thereto from the filter coefficient update circuit 9 through the filter coefficient input terminal 20d. The multiplier 18₂ multiplies an output signal of the delay element 17₁ by a filter coefficient inputted thereto from the filter coefficient update circuit 9 through the filter coefficient input terminal 20c. The multiplier 18₃ multiplies an output signal of the delay element 17₂ by a filter coefficient inputted thereto from the filter coefficient update circuit 9 through the filter coefficient input terminal 20b. The multiplier 18₄ multiplies an output signal of the delay element 17₃ by a filter coefficient inputted thereto from the filter coefficient update circuit 9 through the filter coefficient input terminal 20a.

Figure 4:
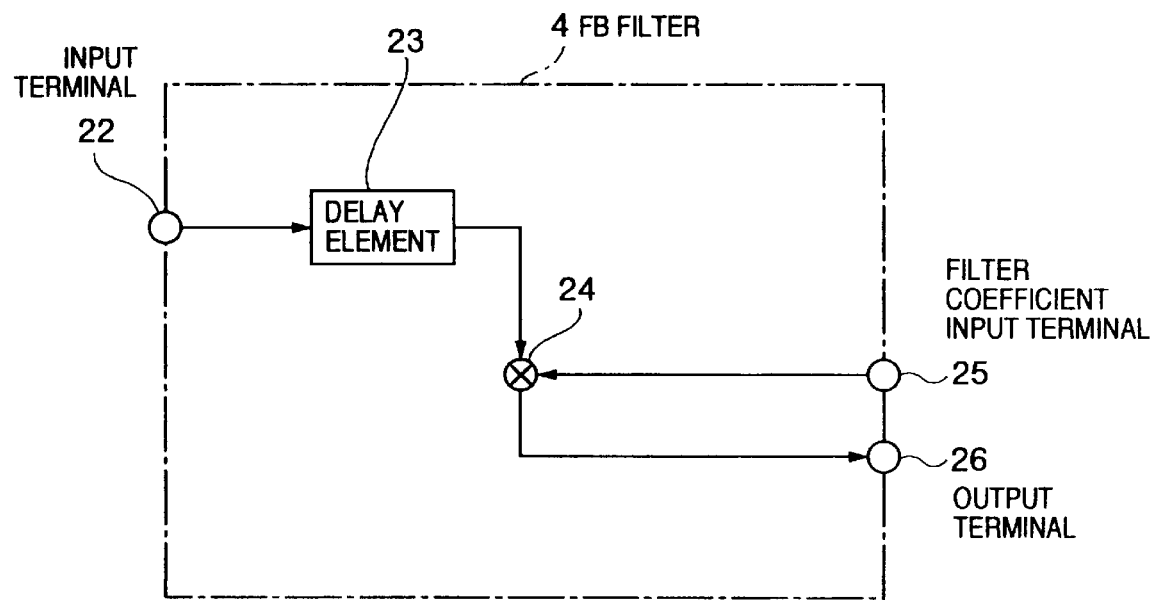
FIG. 4 is a block diagram illustrating the configuration of a feedback filter shown in FIG. 1.

Referring next to FIG. 4, the feedback filter 4 in the DFE equalizer 2 includes an input terminal 22, a filter coefficient input terminal 25, a delay element 23 for delaying an input signal from the input terminal 22, a multiplier 24 for multiplying an output signal of the delay element 23 by a filter coefficient inputted thereto from the filter coefficient update circuit 9 through the filter coefficient input terminal 25, and an output terminal 26 for outputting an output signal of the multiplier 24 to the outside.

The operation of the receiver according to the first embodiment, configured as described above, will be described below. A differential PSK (Phase Shift Keying) modulated signal received by an antenna is frequency converted to generate a baseband signal which is inputted to the input terminal 1 of the receiver. The baseband signal is inputted to the feedforward filter 3 in the DFE equalizer 2, and sequentially delayed by the delay elements 17₁–17₃. The base band signal and the output signals from the respective delay elements 17₁–17₃ are multiplied by the multipliers 18₁–18₄ by filter coefficients inputted to the multipliers 18₁–18₄ from the filter coefficient update circuit 7 through the filter coefficient input terminals 20a–20d, respectively. The output signals of the multipliers 18₁–18₄ are added by the adder 19. The output signal of the adder 19 is inputted to the adder 5 in the DFE equalizer 2 through the output terminal 21 of the feedforward filter 3.

The feedback filter 4 in the DFE equalizer 2 is applied with an output signal of the determination circuit 6. An output signal of the determination circuit 6 is inputted to the delay element 23 through the input terminal 22 of the feedback filter 4, and delayed thereby by a predetermined delay time. The output signal of the delay element 23 is multiplied by the multiplier 24 by a filter coefficient inputted to the multiplier 24 from the filter coefficient update circuit 7 through the filter coefficient input terminal 25. An output signal of the multiplier 24 is inputted to the adder 5 in the DFE equalizer 2 through the output terminal 26 of the feedback filter 4, and added to the output signal of the feedforward filter 3 by the adder 5.

An output signal (prediction signal 10) of the adder 5 in the DFE equalizer 2 is inputted to the determination circuit 6, the filter coefficient update circuit 7, and the differential detector 9. The prediction signal 10 is demodulated in the determination circuit 6 to generate a binary (1 or 0) equalizer demodulated signal. The filter coefficient update circuit 7 updates the filter coefficients applied to the feedforward filter 3 and feedback filter 4 so as to optimize the filter coefficients based on the prediction signal 10 and the equalizer demodulated signal from the determination circuit 6. The differential logic convertor 8 differential-logic-converts the equalizer demodulated signal from the determination circuit 6 to generate a differential-logic-conversion demodulated signal 13a;

The differential detector 9 differential-detects the prediction signal 10. The positive/negative determination circuit 11 demodulates the output signal of the differential detector 6 by positive/negative determination to generate a binary (1 or 0) differential-detection demodulated signal 13b. The selector circuit 12 selects the one having the smaller bit error rate from the differential-logic-conversion demodulated signal 13a and the differential-detection demodulated signal 13b in accordance with the selector circuit information inputted thereto from the outside through the selector circuit information input terminal 14. The selected signal is generated as a selection output signal which is outputted from the output terminal 15 to the outside.

Figure 5:
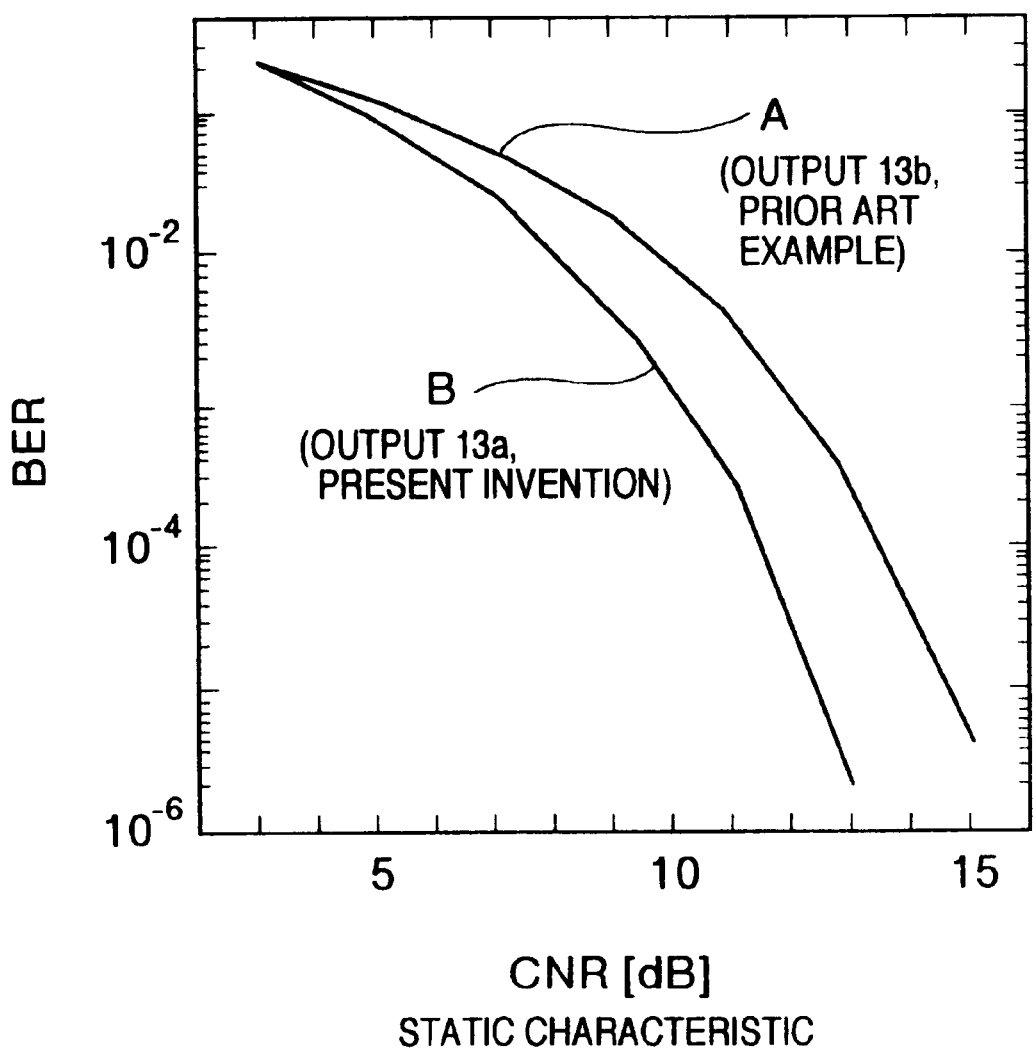
FIG. 5 is a graph representing a static characteristic of the receiver illustrated in FIG. 1.

Next, the selector circuit information inputted to the selector circuit 12 will be explained below with reference to FIGS. 5, 6. In the graphs illustrated in FIGS. 5, 6, the abscissa represents a carrier-to-noise ratio (CNR) and the ordinate represents a bit error rate (BER).

Under a static characteristic (i.e., in environments free from the influence of frequency offset or fading), the differential-logic-conversion demodulated signal 13a represented by a curve B exhibits a better reception characteristic than the differential-detection demodulated signal 13b represented by a curve A. Thus, in the receiver according to the first embodiment under the static characteristic as illustrated, the selector circuit information for forcing the selector circuit 12 to select the differential-logic-conversion demodulated signal 13a is inputted to the selector circuit 12 through the selector circuit information input terminal 14. As a result, the selector circuit 12 selects the differential-logic-conversion demodulated signal 13a as an output signal. In this way, the receiver according to the first embodiment can improve the reception characteristics, compared with a prior art receiver which selects the differential-detection demodulated signal 13 as an output signal even under such a static characteristic, thereby making it possible to prevent deteriorated characteristics in the only-differential-detection scheme under the static characteristic.

Figure 6:
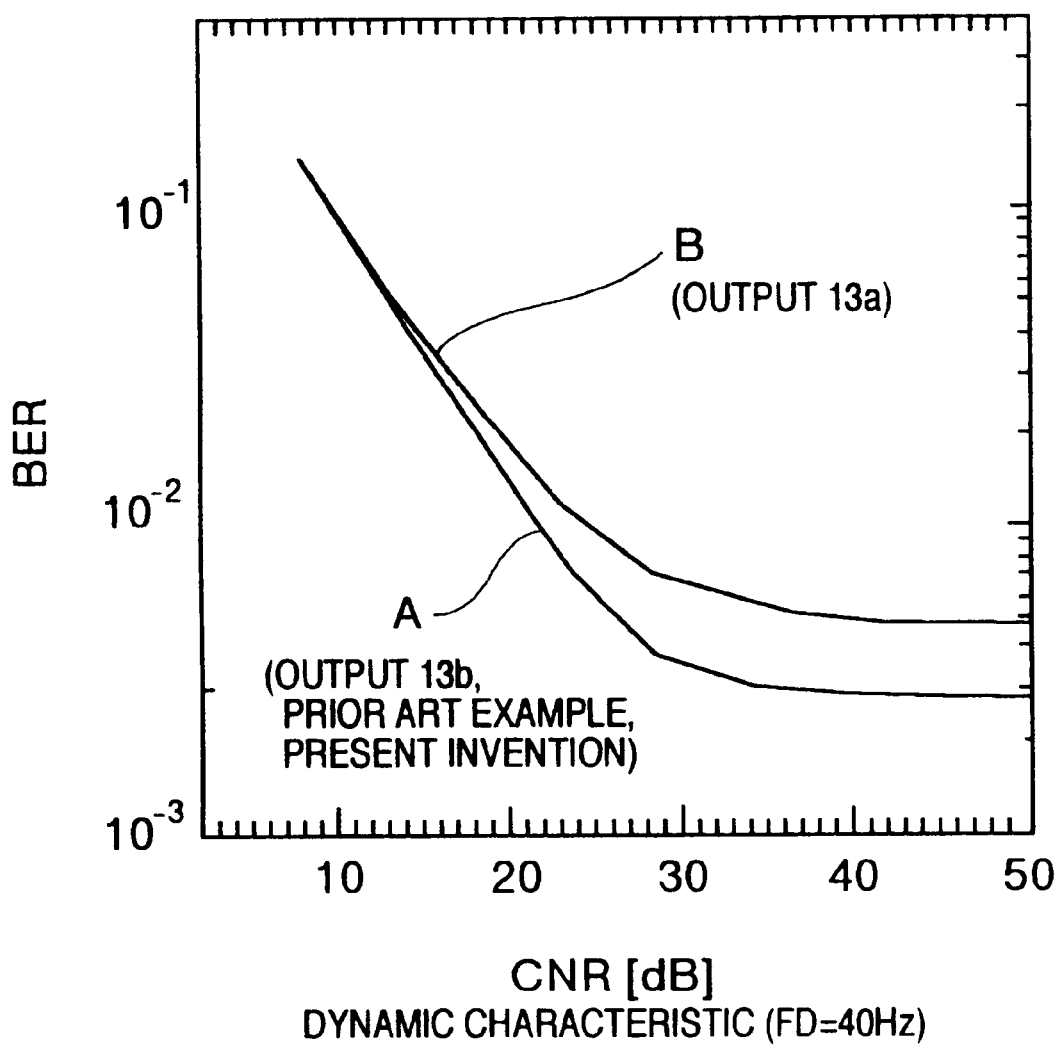
FIG. 6 is a graph representing a dynamic characteristic of the receiver illustrated in FIG. 1.

Under a dynamic characteristic (i.e., in environment in which the influence of frequency offset and fading are present), on the other hand, the differential-logic-conversion demodulated signal 13a represented by a curve B exhibits a worse reception characteristic than the differential-detection demodulated signal 13b represented by a curve A, as illustrated in FIG. 6. Thus, in the receiver according to the first embodiment under the dynamic characteristic as illustrated, the selector circuit information for forcing the selector circuit 12 to select the differential-detection demodulated signal 13b is inputted to the selector circuit 12 through the selector circuit information input terminal 14. As a result, the selector circuit 12 selects the differential-detection demodulated signal 13b as an output signal. In this way, the receiver according to the first embodiment can provide the reception characteristics equivalent to those of the prior art receiver under the dynamic characteristic as mentioned above, so that good reception characteristics can be maintained even in environment in which the influence of frequency offset and fading are present.

While in the foregoing description, the feedforward filter 3 is composed of three delay elements $17_1$–$17_3$ and four multipliers $18_1$–$18_4$, similar effects can be produced even if the feedforward filter 3 takes another configuration. In addition, while the feedback filter 4 is composed of one delay element 23 and one multiplier 24, similar effects can be produced even if the feedback filter 4 takes another configuration. Furthermore, while the receiver of the first embodiment is assumed to have a configuration for single branch reception having one input terminal 1, the receiver may have a configuration for plural branch reception having a multiplicity of input terminals.

(Second Embodiment)

Figure 7:
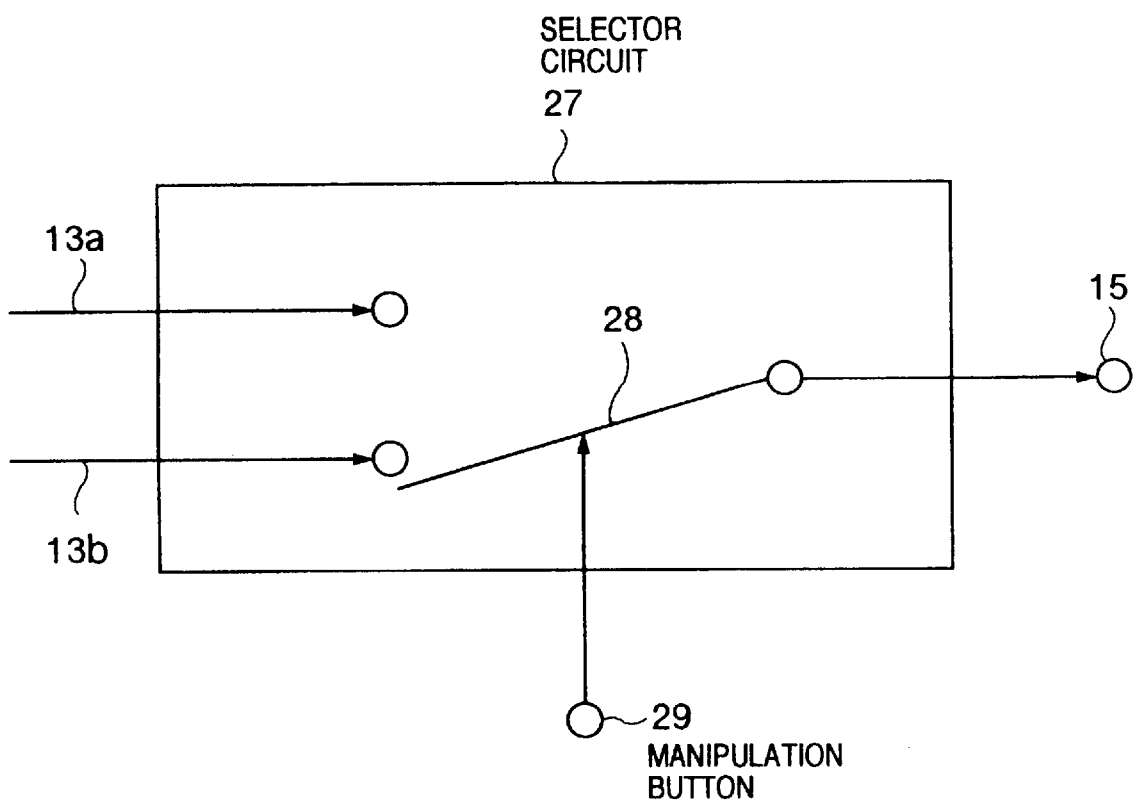
FIG. 7 is a block diagram illustrating the configuration of a selector circuit in a receiver according to a second embodiment of the present invention.

Referring next to FIG. 7, a receiver according to a second embodiment of the present invention differs from the foregoing receiver according to the first embodiment in that the former has a selector circuit 27 comprising a switch 28 for selecting either a differential-logic-conversion demodulated signal 13a or a differential-detection demodulated signal 13b, and a manipulation button 29 for controlling a switching operation of the switch 28, in place of the selector circuit 12 illustrated in FIG. 2.

In the receiver according to the second embodiment, a speaker himself of a portable telephone incorporating the receiver, for example, may manipulate the manipulation button 29 to operate the switch 28 to select either the differential-logic-conversion demodulated signal 13a or the differential-detection demodulated signal 13b. It will therefore be appreciated that the receiver of the second embodiment can switch the differential-logic-conversion demodulated signal 13a and the differential-detection demodulated signal 13b in a simple hardware configuration.

(Third Embodiment)

Figure 8:
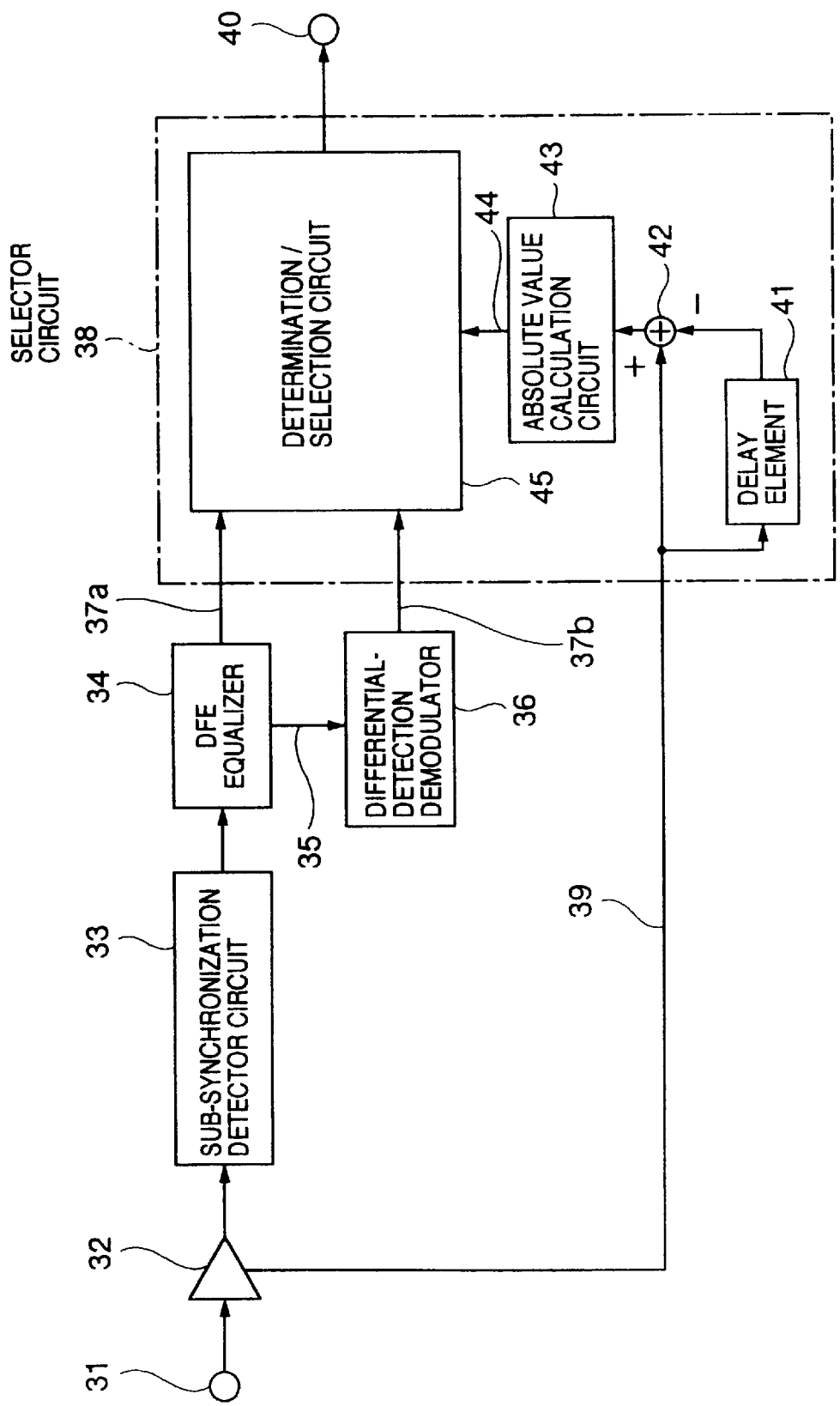
FIG. 8 is a block diagram illustrating the configuration of a receiver according to a third embodiment of the present invention.

Referring next to FIG. 8, a receiver according to a third embodiment of the present invention comprises an input terminal 31, an amplifier 32, a sub-synchronization detector circuit 33, a DFE equalizer 34, a differential-detection demodulator 36, a selector circuit 38, and an output terminal 40. In this configuration, the input terminal 31 is applied with a received signal in an intermediate frequency band from the outside. The amplifier 32 amplifies a received signal inputted through the input terminal 31. The amplifier 32 also outputs an amplifier gain signal 39 indicative of the gain of the amplifier 32. The sub-synchronization detector circuit 33 frequency-converts the received signal in the intermediate frequency band from the amplifier 32 to generate a baseband received signal. The DFE equalizer 34, which compensates intersymbol interference included in the baseband received signal inputted thereto from the sub-synchronization detector circuit 33, has a similar configuration to the DFE equalizer 2 illustrated in FIG. 2. The DFE equalizer 34 outputs a prediction signal 35 and a differential-logic-conversion demodulated signal 37a. The differential-detection demodulator 36 differential-detects the prediction signal 35 from the DFE equalizer 34 and then demodulates the differential-detected prediction signal. The differential-detection demodulator 36 outputs a differential-detection demodulated signal 37b.

The selector circuit 38 selects either the differential-logic-conversion demodulated signal 37a from the DFE equalizer 34 or the differential-detection demodulated signal 37b from the differential-detection demodulator 36, in accordance with the amplifier gain signal 39 inputted thereto from the amplifier 32. The selector circuit 38 includes a delay element 41 applied with the amplifier gain signal 39, an adder 42 for subtracting an output signal of the delay element 41 from the amplifier gain signal 39, an absolute value calculation circuit 43 for calculating an absolute value of an output signal of the adder 42 to generate a received-level fluctuation signal 44, and a determination/selection circuit 45 for selecting either the differential-logic-conversion demodulated signal 37a or the differential-detection demodulated signal 37b in accordance with the received-level fluctuation signal 44. An output signal of the selector circuit 38 is delivered to the outside through the output terminal 40.

In the receiver according to the third embodiment configured as described above, the received signal in the intermediate frequency band, inputted to the input terminal 31, has its amplitude adjusted by the amplifier 32 such that the output level of the amplifier 32 remains constant. The amplifier gain signal 39 indicative of the gain of the amplifier 32 at this time is inputted to the selector circuit 38. The output signal of the amplifier 32 is frequency-converted by the sub-synchronization detector circuit 33 to be converted to the baseband received signal. The DFE equalizer 34 compensates the intersymbol interference included in the baseband received signal. The prediction signal 35 outputted from the DFE equalizer 34 is differential-detected and then demodulated by the differential-detection demodulator 36 to be converted to the differential-detection demodulated signal 37b.

In the selector circuit 38, the amplifier gain signal 39 is delayed by the delay element 41 by a predetermined time, and the output signal of the delay element 41 is subtracted from the amplifier gain signal 39 by the adder 42. With this processing, a signal indicative of fluctuations in received level during the predetermined time is generated from the adder 42. The output signal of the adder 42 is inputted to the absolute value calculation circuit 43 which calculates an absolute value of the output signal of the adder 42, whereby the output signal of the adder 42 is converted to the received-level fluctuation signal 44. The determination/selection circuit 45 selects the differential-detection demodulated signal 37b when the received-level fluctuation signal 44 indicates level fluctuations equal to or higher than a predetermined level, and selects the differential-logic-conversion demodulated signal 37a when the received-level fluctuation signal 44 indicates level fluctuations lower than the predetermined level.

Since the receiver according to the third embodiment configured as described above can automatically select either the differential-detection demodulated signal 37b or the differential-logic-conversion demodulated signal 37a while monitoring fluctuations in received level of the received signal, the reception performance can be improved.

(Fourth Embodiment)

Figure 9:
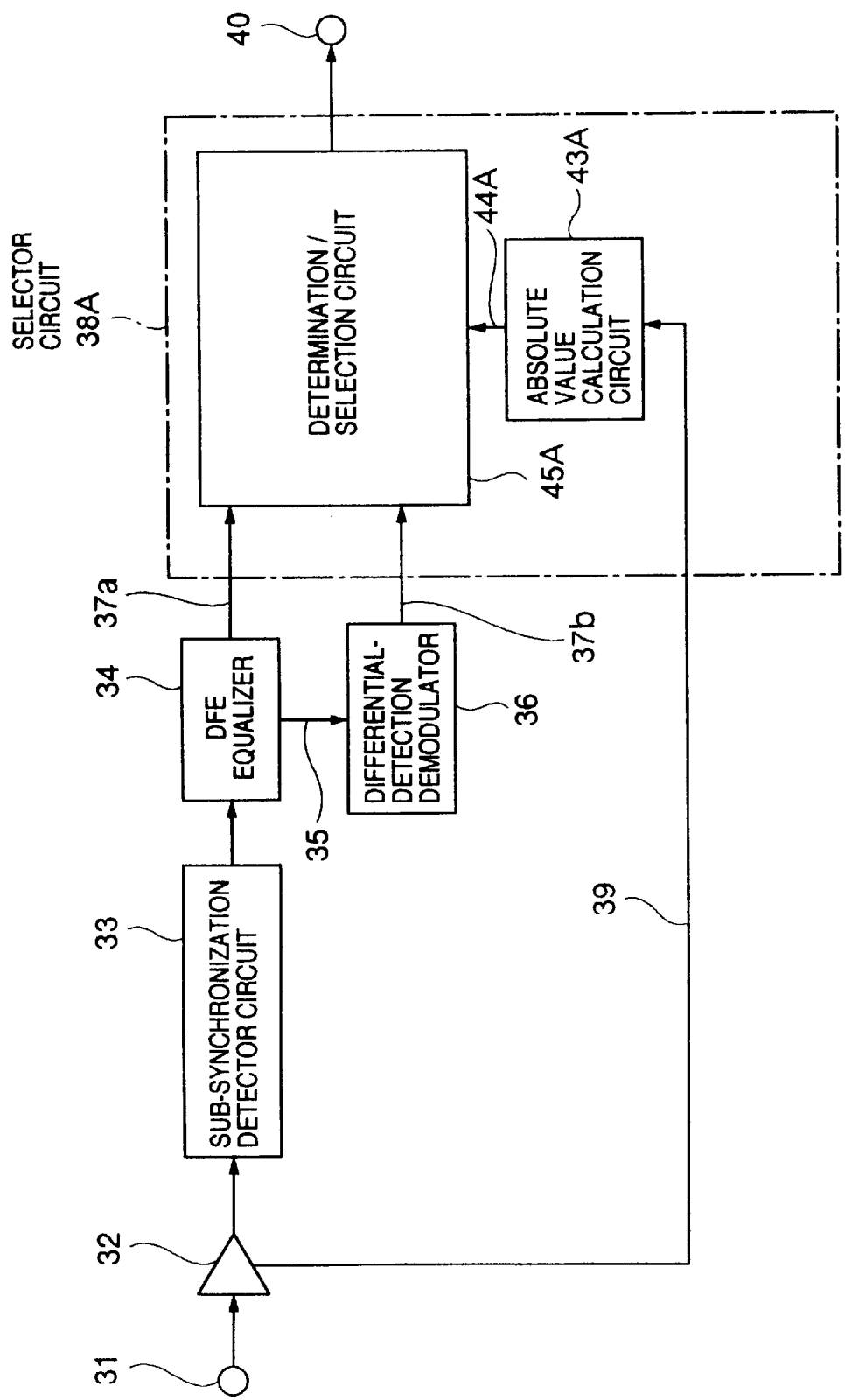
FIG. 9 is a block diagram illustrating the configuration of a receiver according to a fourth embodiment of the present invention.

Referring next to FIGS. 9, a receiver according to a fourth embodiment of the present invention differs from the receiver according to the foregoing third embodiment in that an absolute value calculation circuit 43A in a selector circuit 38A calculates an absolute value of an amplifier gain signal 39 to generate an average received-level signal 44A, and a determination/selection circuit 45A in the selector circuit 38A selects either a differential-detection demodulated signal 37b or a differential-logic-conversion demodulated signal 37a in accordance with the average received-level signal 44A.

More specifically, the selector circuit 38 in the receiver according to the foregoing third embodiment operates in accordance with a received-level fluctuation scheme which selects either the differential-detection demodulated signal 37b or the differential-logic-conversion demodulated signal 37a in accordance with the received-level fluctuations in the received signal detected by the delay element 41 and the adder 42. On the other hand, the selector circuit 38A in the receiver according to the fourth embodiment operates in accordance with an average received-level measurement scheme, wherein the absolute value of the gain of the amplifier 32, indicated by the amplifier gain signal 39, is calculated, and one of the differential-detection demodulated signal 37b and the differential-logic-conversion demodulated signal 37a is selected in accordance with the calculated absolute value of the gain.

Since the receiver according to the fourth embodiment can automatically select either the differential-detection demodulated signal 37b or the differential-logic-conversion demodulated signal 37a while monitoring the average received-level of the received signal, in a similar manner, the reception performance can be improved.

(Fifth Embodiment)

Figure 10:
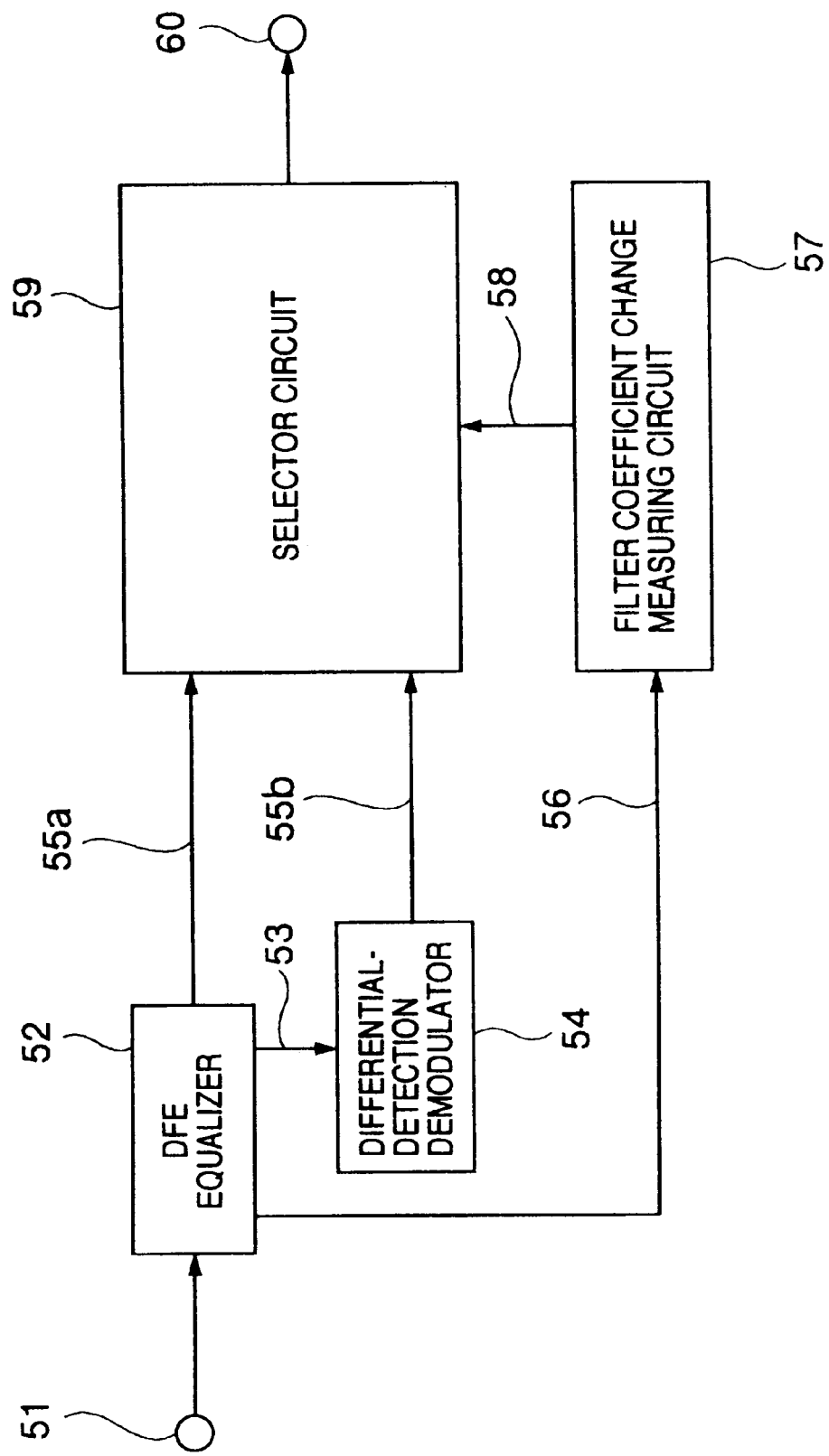
FIG. 10 is a block diagram illustrating the configuration of a receiver according to a fifth embodiment of the present invention.

Referring next to FIG. 10, a receiver according to a fifth embodiment of the present invention includes an input terminal 51, a DFE equalizer 52, a differential-detection demodulator 54, a filter coefficient change measuring circuit 57, a selector circuit 59, and an output terminal 60. In this configuration, the input terminal 51 is applied with a differential-PSK-modulated baseband received signal. The DFE equalizer 52, which compensates intersymbol interference included in the baseband received signal inputted from the outside through the input terminal 51, has a similar configuration to the DFE equalizer 2 illustrated in FIG. 2, except that a filter coefficient signal 56 indicative of respective filter coefficients outputted to the feedforward filter 3 and the feedback filter 4 is outputted from the filter coefficient update circuit 7 to the outside. The DFE equalizer 52 also outputs a prediction signal 53 and a differential-logic-conversion demodulated signal 55a. The differential-detection demodulator 54 differential-detects the prediction signal 53 from the DFE equalizer 52 and then demodulates the differential-detected prediction signal. The differential-detection demodulator 54 outputs a differential-detection demodulated signal 55b.

Figure 11:
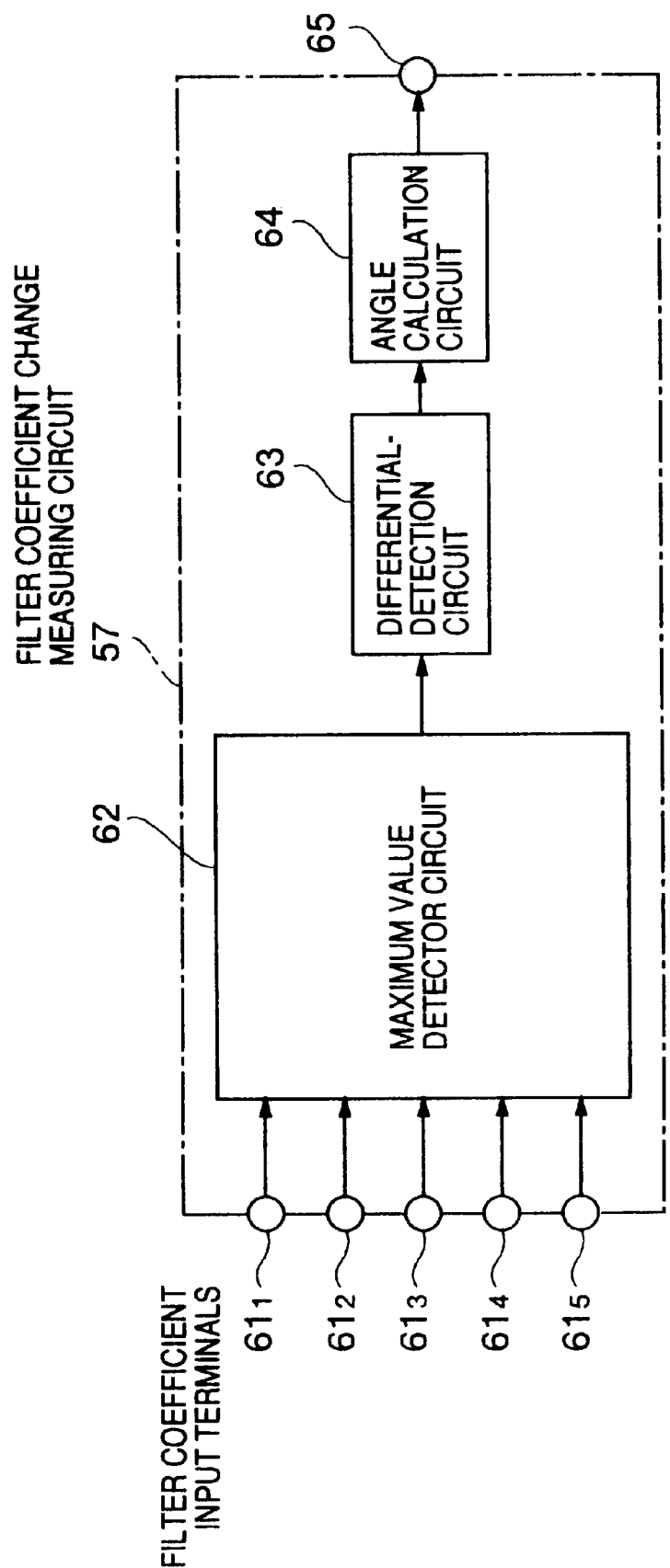
FIG. 11 is a block diagram illustrating the configuration of a filter coefficient change measuring circuit shown in FIG. 10.

The filter coefficient change measuring circuit 57 measures the amount of change in each filter coefficient using the filter coefficient signal 56 from the DFE equalizer 52. The filter coefficient change measuring circuit 57, as illustrated in FIG. 11, includes filter coefficient input terminals $61_1$–$61_5$ respectively applied with filter coefficients indicated by the filter coefficient signal 56, a maximum value detector circuit 62 for calculating the power of the respective filter coefficients inputted through the filter coefficient input terminals $61_1$–$61_5$ to detect a maximum value (maximum power) of the respective calculated power, a differential detector circuit 63 for differential-detecting the maximum power detected by the maximum value detector circuit 62, and an angle calculation circuit 64 for calculating arc-tangent of the maximum power, differential-detected by the differential detector circuit 63, to derive the angle of each filter coefficient having the maximum power. An output signal of the angle calculation circuit 64 is outputted from the output terminal 65 to the outside as a filter coefficient change amount signal 58.

The selector circuit 59 selects either the differential-logic-conversion demodulated signal 55a from the DFE equalizer 52 or the differential-detection demodulated signal 55b from the differential-detection demodulator 54 in accordance with the filter coefficient change amount signal 58 inputted thereto from the filter coefficient change measuring circuit 57. Specifically, the selector circuit 59 selects the differential-detection demodulated signal 55b when the angle indicated by the filter coefficient change amount signal 58 is equal to or more then a predetermined value, and selects the differential-logic-conversion demodulated signal 55a when the angle indicated by the filter coefficient change amount signal 58 is less than the predetermined value. An output signal of the selector circuit 60 is outputted to the outside through the output terminal 60.

Since the receiver according to the fifth embodiment configured as described above can automatically select either the differential-detection demodulated signal 55b or the differential-logic-conversion demodulated signal 55a while monitoring the amounts of changes in filter coefficients of filters possessed by the DFE equalizer 52, the reception performance can be improved even if a frequency offset exists.

(Sixth Embodiment)

Figure 12:
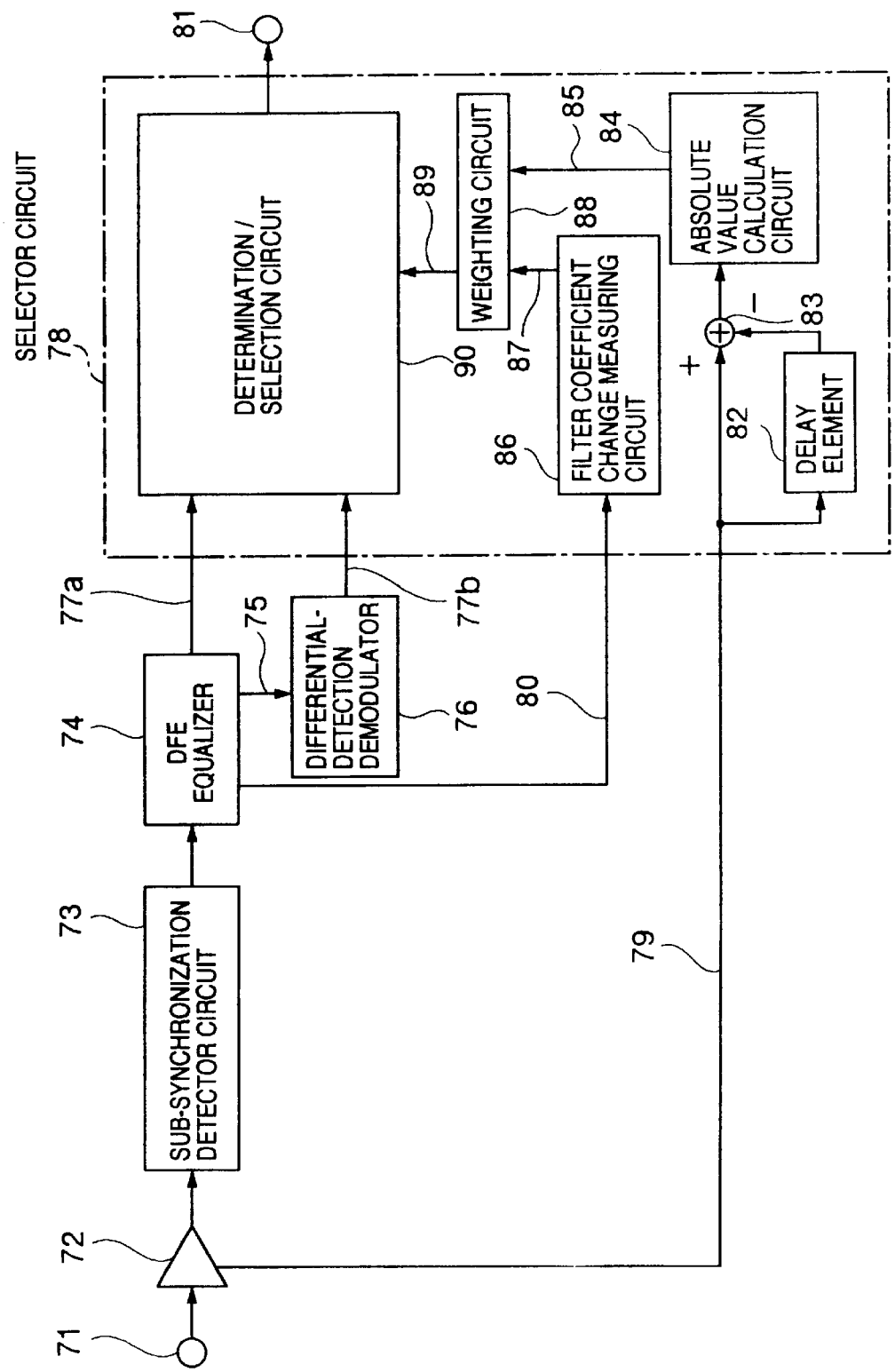
FIG. 12 is a block diagram illustrating a receiver according to a sixth embodiment of the present invention.

Referring next to FIG. 12, a receiver according to a sixth embodiment of the present invention differs from the receiver according to the third embodiment illustrated in FIG. 8 in that a selector circuit 78 comprises a filter coefficient change measuring circuit 86 coupled to receive a filter coefficient signal 80 from a DFE equalizer 74, and a weighting circuit 88 coupled to receive an average received-level signal 85 from an absolute value calculation circuit 84 as well as to receive a filter coefficient change amount signal 87 from the filter coefficient change measuring circuit 86, and that a determination/selection circuit 90 selects either a differential-detection demodulated signal 77b or a differential-logic-conversion demodulated signal 77a in accordance with a weighted signal 89 from the weighting circuit 88.

In the receiver of the sixth embodiment, a received signal in an intermediate frequency band inputted to the input terminal 71 from the outside is amplified by an amplifier 72, and then frequency-converted by a sub-synchronization detector circuit 73 to be converted to a baseband signal. Intersymbol interference included in this baseband signal is compensated for by the DFE equalizer 74. A prediction signal 75 outputted from the DFE equalizer 74 is differential-detected and then demodulated by the differential-detection demodulator 76 to be converted to the differential-detection demodulated signal 77b. The differential-logic-conversion demodulated signal 77a outputted from the DFE equalizer 74 and the differential-detection demodulated signal 77b outputted from the differential-detection demodulator 76 are both inputted to the determination/selection circuit 90 in the selector circuit 78.

An amplifier gain signal 79 indicative of the gain of the amplifier 72, outputted from the amplifier 72, is inputted to a delay element 82 and an adder 83 in the selector circuit 78, so that the adder 83 subtracts a gain indicated by the amplifier gain signal 79 delayed by the delay element 82 from a current gain indicated by the amplifier gain signal 79. An output signal of the adder 83 is inputted to an absolute value calculation circuit 84 in the selector circuit 78 to calculate an absolute value of the subtraction result, thereby generating a received-level fluctuation signal 85 indicative of fluctuations in received level. The filter coefficient signal 80 outputted from the DFE equalizer 74 is inputted to the filter coefficient change amount measuring circuit 86 which measures the amounts of changes in filter coefficients and generates a filter coefficient change amount signal 87 indicative of the measured amounts of changes in filter coefficients.

The filter coefficient change amount signal 87 outputted from the filter coefficient change measuring circuit 86 and the received-level fluctuation signal 85 outputted from the absolute value calculation circuit 84 are both inputted to the weighting circuit 88 which applies predetermined weighting to the filter coefficient change amount signal 87 and the received-level fluctuation signal 85. After the weighting, the signal having the larger value is selected. More specifically, assuming that weighting of 1:1 is applied to the filter coefficient change amount signal 87 and the received-level fluctuation signal 85, when either the filter coefficient change amount signal 87 or the received-level fluctuation signal 85 has a large value, or when both of the filter coefficient changing amount signal 87 and the received-level fluctuation signal 85 have large values, a weighted signal 89 outputted from the weighting circuit 88 has a large value.

The determination/selection circuit 90 in the selector circuit 78 selects the differential-detection demodulated signal 77b as a selection output signal when a value indicated by the weighted signal 89 is larger than a predetermined threshold value, and selects the differential-logic-conversion demodulated signal 77a as a selection output signal when a value indicated by the weighted signal 89 is smaller than the predetermined threshold value. The selected selection output signal is outputted from an output terminal 81 to the outside.

Since the receiver according to the sixth embodiment configured as described above can automatically select either the differential-detection demodulated signal 77b or the differential-logic-conversion demodulated signal 77a while monitoring the amounts of changes in filter coefficients of the filters possessed by the DFE equalizer 74 and fluctuations in received level of the received signal, the reception performance can be improved.

What is claimed is:

1. A receiver comprising:
   equalizing means for compensating transmission path characteristics of a baseband received signal to generate a prediction signal and for differential-logic-converting a demodulated signal generated by demodulating said prediction signal to generate a differential-logic-conversion demodulated signal;
   differential-detection demodulating means for differential-detecting said prediction signal from said equalizing means and thereafter demodulating the differential-detected prediction signal to generate a differential-detection demodulated signal; and
   selecting means for selecting either said differential-logic-conversion demodulated signal from said equalizing means or said differential-detection demodulated signal from said differential-detection demodulating means.

2. A receiver according to claim 1, wherein:
   said equalizing means comprises:
   a feedforward filter coupled to receive said baseband received signal;
   an adder for generating said prediction signal;
   determining means for demodulating said prediction signal to generate said demodulated signal;
   a feedback filter coupled to receive said demodulated signal;
   filter coefficient updating means for updating filter coefficients of said feedforward filter and said feedback filter based on said prediction signal and said demodulated signal; and
   a differential logic convertor for differential-logic-converting said demodulated signal to generate said differential-logic-conversion demodulated signal,
   wherein said adder adds an output signal of said feedforward filter and an output signal of said feedback filter to generate said prediction signal.

3. A receiver according to claim 1, wherein:
   said selecting means comprises:
   a switch for switching said differential-logic-conversion demodulated signal and said differential-detection demodulated signal; and
   a manipulation button for controlling a switching operation of said switch.

4. A receiver according to claim 3, wherein said receiver is incorporated in a portable telephone.

5. A receiver according to claim 2, wherein:
   said selecting means comprises:
   a switch for switching said differential-logic-conversion demodulated signal and said differential-detection demodulated signal; and
   a manipulation button for controlling a switching operation of said switch.

6. A receiver according to claim 5, wherein said receiver is incorporated in a portable telephone.

7. A receiver according to claim 1, further comprising:
   amplifying means disposed on an input side of said equalizing means for amplifying a received signal in an intermediate frequency band; and
   sub-synchronization detecting means disposed between said amplifying means and said equalizing means for frequency-converting said amplified received signal to generate said baseband received signal,
   wherein said selecting means selects either said differential-logic-conversion demodulated signal or said differential-detection demodulated signal in accordance with fluctuations in received level of said received signal derived on the basis of a gain of said amplifying means.

8. A receiver according to claim 7, wherein:
   said selecting means comprises:
   delay means for delaying a gain signal, which is indicative of the gain of said amplifying means and is inputted thereto from said amplifying means, by a predetermined time; and
   calculating means for deriving the fluctuations in received level of said received signal using said gain signal and an output signal of said delay means.

9. A receiver according to claim 1, further comprising:
   amplifying means disposed on an input side of said equalizing means for amplifying a received signal in an intermediate frequency band; and
   sub-synchronization detecting means disposed between said amplifying means and said equalizing means for frequency converting said amplified received signal to generate said baseband received signal,
   wherein said selecting means selects either said differential-logic-conversion demodulated signal or said differential-detection demodulated signal in accordance with an average received level of said received signal calculated based on a gain of said amplifying means.

10. A receiver according to claim 9, wherein:

said selecting means includes:
- absolute value calculating means for calculating an absolute value of the gain of said amplifying means to derive the average received level of said received signal.

11. A receiver according to claim 2, wherein:

said selecting means selects either said differential-logic-conversion demodulated signal or said differential-detection demodulated signal in accordance with the amounts of changes in filter coefficients of said feedforward filter and said feedback filter.

12. A receiver according to claim 11, wherein:

said selecting means comprises:
- maximum value detecting means for calculating power of the filter coefficients of said feedforward filter and said feedback filter, and for detecting a maximum value of said calculated power;
- differential detecting means for differential-detecting said maximum value of the power detected by said maximum value detecting means; and
- angle calculating means for calculating arc-tangent of said maximum value of said power differential-detected by said differential detecting means to derive an angle of said filter coefficient having said maximum value of the power,
- wherein said selecting means selects either said differential-logic-conversion demodulated signal or said differential-detection demodulated signal in accordance with said angle calculated by said angle calculating means.

13. A receiver according to claim 2, further comprising:
- amplifying means disposed on an input side of said equalizing means for amplifying a received signal in an intermediate frequency band; and
- sub-synchronization detecting means disposed between said amplifying means and said equalizing means for frequency-converting said amplified received signal to generate said baseband received signal,
- wherein said selecting means selects either said differential-logic-conversion demodulated signal or said differential-detection demodulated signal in accordance with amounts of changes in the filter coefficients of said feedforward filter and said feedback filter and fluctuations in received level of said received signal derived on the basis of a gain of said amplifying means.

14. A receiver according to claim 13, wherein:

said selecting means comprises:
- delay means for delaying a gain signal, which is indicative of the gain of said amplifying means and is inputted thereto from said amplifying means, by a predetermined time;
- calculating means for deriving the fluctuations in received level of said received signal using said gain signal and an output signal of said delay means;
- maximum value detecting means for calculating power of the filter coefficients of said feedforward filter and said feedback filter, and for detecting a maximum value of said calculated power;
- differential detecting means for differential-detecting said maximum value of the power detected by said maximum value detecting means;
- angle calculating means for calculating arc-tangent of said maximum value of said power differential-detected by said differential detecting means to calculate an angle of said filter coefficient having said maximum value of the power; and
- weighting means for weighting the fluctuations in received level of said received signal derived by said calculating means and said angle calculated by said angle calculating means, and subsequently selecting one having a larger value from said weighted fluctuations in received level of said received signal and said weighted angle,
- wherein said selecting means selects either said differential-logic-conversion demodulated signal or said differential-detection demodulated signal in accordance with said weighted fluctuations in received level of said received signal or said weighted angle selected by said weighting means.

* * * * *